(12) United States Patent
Fang et al.

(10) Patent No.: US 11,113,516 B2
(45) Date of Patent: Sep. 7, 2021

(54) PEOPLE FLOW ESTIMATION SYSTEM AND PEOPLE FLOW ESTIMATION METHOD

(71) Applicant: Carrier Corporation, Palm Beach Gardens, FL (US)

(72) Inventors: Hui Fang, Shanghai (CN); Zhen Jia, Shanghai (CN); Keyu Li, Shanghai (CN); Zhengang Zhu, Shanghai (CN); Xiangbao Li, Shanghai (CN); Mei Chen, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 85 days.

(21) Appl. No.: 16/490,311

(22) PCT Filed: Feb. 26, 2018

(86) PCT No.: PCT/US2018/019636
§ 371 (c)(1),
(2) Date: Aug. 30, 2019

(87) PCT Pub. No.: WO2018/160477
PCT Pub. Date: Sep. 7, 2018

(65) Prior Publication Data
US 2020/0074164 A1 Mar. 5, 2020

(30) Foreign Application Priority Data
Mar. 1, 2017 (CN) .......................... 201710116408.9

(51) Int. Cl.
*G06K 9/00* (2006.01)
*G06N 7/00* (2006.01)
*G08B 13/196* (2006.01)

(52) U.S. Cl.
CPC ......... *G06K 9/00369* (2013.01); *G06N 7/005* (2013.01); *G08B 13/196* (2013.01)

(58) Field of Classification Search
CPC ........... G06K 9/00369; G06K 9/00778; G06K 9/00201; G06K 9/00771; G06K 9/00785;
(Continued)

(56) References Cited

U.S. PATENT DOCUMENTS

| 5,703,367 A | 12/1997 | Hashimoto et al. |
| 7,529,646 B2 | 5/2009 | Lin et al. |

(Continued)

FOREIGN PATENT DOCUMENTS

| CN | 101751553 B | 6/2010 |
| CN | 205232359 U | 5/2016 |

(Continued)

OTHER PUBLICATIONS

Cunningham, John P., et al., "A closed-loop human simulator for investigating the role of feedback control in brain-machine interfaces", J Neurophysiol 105: 2011, pp. 1932-1949.
(Continued)

*Primary Examiner* — Jose L Couso
(74) *Attorney, Agent, or Firm* — Cantor Colburn LLP

(57) ABSTRACT

The present invention provides a human flow estimation system and a human flow estimation method. The human flow estimation system comprises: a sensor network comprising a plurality of sensors for collecting data and respectively arranged in each to-be-estimated region and between the to-be-estimated regions; a model building module configured to build a horizontal human flow model and a vertical human flow model based on the plurality of sensors arranged in each to-be-estimated region and/or arranged between the to-be-estimated regions; and a human flow estimation module configured to estimate human flow data based on the horizontal human flow model and the vertical human flow model. The human flow estimation system and the human flow estimation method according to the present
(Continued)

invention can realize high-precision estimation of human flow data in a three-dimensional space.

21 Claims, 4 Drawing Sheets

(58) Field of Classification Search
CPC ........... G06K 9/00362; G06K 9/00228; G06K 9/00677; G06K 9/00724; G06K 2009/00738; G05N 7/005; G05N 7/00; G05N 5/04; G05N 5/048; G05N 20/00; G08B 13/196; G08B 13/194; G08B 7/066; G06Q 10/0631; G06Q 10/087; G06Q 10/04; B61L 27/0027; B61L 27/0077; G06M 1/27; G06M 1/10; G06M 7/00; G06M 9/00; G06M 11/00; G06T 2207/10016; G06T 2207/30196; G06T 2207/30242; G06T 2207/30232; G06T 7/254; G06T 7/215; G06T 7/70; G06T 7/80; G06T 7/97; G06T 17/00; H04N 7/18; H04N 7/181; H04N 3/1562; H04N 3/1587; G07C 9/00; G08G 1/04; G01C 21/206; B66B 3/006

See application file for complete search history.

(56) References Cited

U.S. PATENT DOCUMENTS

| | | |
|---|---|---|
| 7,594,564 B2 | 9/2009 | Siikonen et al. |
| 8,775,359 B2 | 7/2014 | Tomastik |
| 8,788,448 B2 | 7/2014 | Fadell et al. |
| 9,122,908 B2 | 9/2015 | Lin et al. |
| 2004/0163325 A1 | 8/2004 | Parrini et al. |
| 2010/0250481 A1 | 9/2010 | Tomastik |
| 2010/0299116 A1 | 11/2010 | Tomastik et al. |
| 2011/0007944 A1 | 1/2011 | Atrazhev et al. |
| 2011/0134247 A1 | 6/2011 | Minegishi |
| 2013/0242074 A1* | 9/2013 | Sekiguchi ............. G08B 7/066 348/77 |
| 2014/0139633 A1 | 5/2014 | Wang et al. |
| 2015/0149133 A1* | 5/2015 | Do ......................... G01S 5/0236 703/6 |

FOREIGN PATENT DOCUMENTS

| | | |
|---|---|---|
| WO | 2014084832 A1 | 6/2014 |
| WO | 2016073292 A1 | 5/2016 |

OTHER PUBLICATIONS

International Search Report and Written Opinion for application PCT/US2018/019536, dated Apr. 30, 2018, 11 pages.
Kuusinen, Juha-Matti, "People Flow in Buildings—Evacuation Experiments and Modelling of Elevator Passenger Traffic", Aalto University, School of Science, 2015, 42 pages.
Labeodan, Timilehin, et al., "Occupancy measurement in commercial office buildings for demand-driven control applications—A survey and detection system evaluation", Energy and Buildings, vol. 93, 15 Apr. 2015, 36 pages.
Meyn, Sean, "A Sensor-Utility-Network Method for Estimation of Occupancy Distribution in Buildings", Decision and Control, 2009 held jointly with the 2009 28th Chinese Control Conference, 8 pages.
O'Neill, Zhang, et al., "Model-Based Thermal Load Estimation in Buildings", Fourth National Conference of IBPSA-USA, NY, 2010, 8 pages.
Pan, Shijia, et al., "Occupant traffic estimation through structural vibration sensing", Conference Paper • Apr. 2016, 13 pages.
Settles, Burr, "Active Learning Literature Survey", Computer Sciences Technical Report 1648, University of Wisconsin—Madison, Updated on: Jan. 26, 2010, 67 pages.
Tomastik, R., et al., "Model-Based Real-Time Estimation of Building Occupancy During Emergency Egress" Pedestrian and Evacuation Dynamics 2008. Springer Berlin Heidelberg, 2010, 11 pages.
Tomastik, R., et al., "Video-Based Estimation of Building Occupancy During Emergency Egress", 2008 American Control Conference, Jun. 11-13, 2008, 8 pages.
Wang, Heng-Tao, et al., "Building occupant level estimation based on heterogeneous information fusion", Information Sciences 272 (2014), pp. 145-157.

\* cited by examiner

PEOPLE FLOW ESTIMATION SYSTEM AND PEOPLE FLOW ESTIMATION METHOD

TECHNICAL FIELD

The present invention relates to the field of human flow estimation, and more specifically, to a human flow estimation system and a human flow estimation method.

BACKGROUND ART

A human flow estimation system plays a critical role in a variety of construction applications. Generally speaking, solutions based on sensor fusion are extensively studied and applied to estimation of human flow within a construction. However, most of the currently applied human flow estimation systems and methods are only used to estimate human flow data in the horizontal direction (for example, a certain floor in a building) and rarely estimate human flow data in the vertical direction (for example, between floors). This makes the current human flow estimation systems still not accurate enough when used in multi-floor constructions.

In addition, the current human flow estimation systems are usually implemented depending on a single sensor or a combination of sensors, where solutions based on a combination of sensors are extensively studied and applied to estimation of large-scale human flow in a plurality of regions or within a whole construction. However, the current sensor-fused systems are still not accurate enough in practical application. For example, misestimation caused by accumulation of multiple errors may happen. How to apply non-sensor information to a human flow estimation system so as to estimate human flow data with higher accuracy has become a technical problem to be solved urgently.

SUMMARY OF THE INVENTION

The objective of the present invention is to provide a high-precision three-dimensional human flow estimation system.

Another objective of the present invention is to provide a human flow estimation method for improving the accuracy of a human flow estimation system.

In order to realize the objective of the present invention, according to one aspect of the present invention, a human flow estimation system is provided, comprising: a sensor network comprising a plurality of sensors for collecting data and respectively arranged in each to-be-estimated region and between the to-be-estimated regions; a model building module configured to build a horizontal human flow model and a vertical human flow model based on the plurality of sensors arranged in each to-be-estimated region and/or arranged between the to-be-estimated regions; and a human flow estimation module configured to estimate human flow data based on the horizontal human flow model and the vertical human flow model.

In order to realize another objective of the present invention, according to another aspect of the present invention, a human flow estimation method comprising the previously stated human flow estimation system is further provided, comprising: a data collection step S100, for collecting data in each to-be-estimated region and between the to-be-estimated regions through a sensor network; a model building step S200, for building a horizontal human flow model and a vertical human flow model based on the data in each to-be-estimated region and/or between the to-be-estimated regions; and a human flow estimation step S300, for estimating human flow data based on the horizontal human flow model and the vertical human flow model.

DETAILED DESCRIPTION

Figure 1:
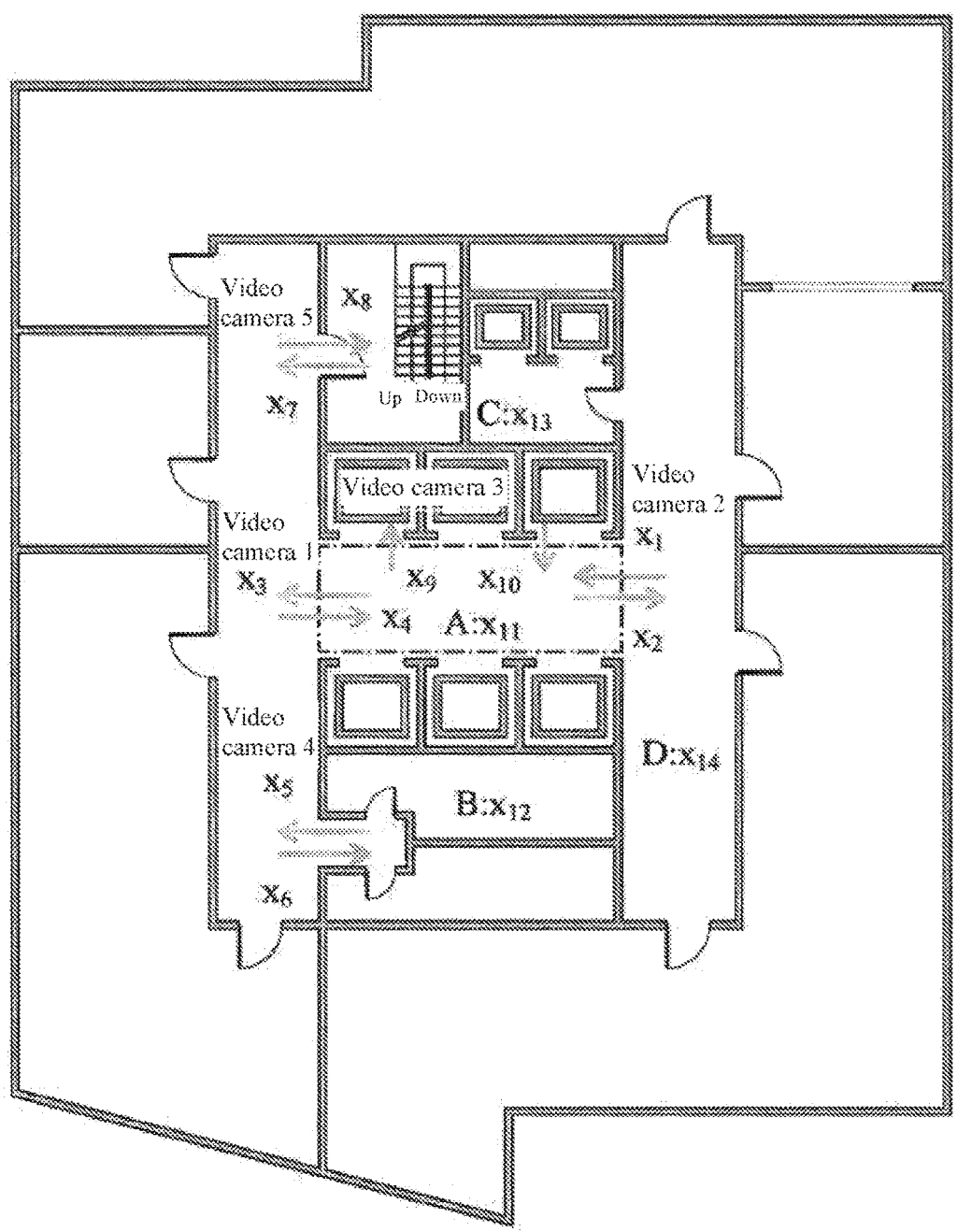
FIG. 1 is a schematic layout diagram of a specific floor in an embodiment where the human flow estimation system of the present invention is applied in a building with multiple floors.

The present invention shows a human flow estimation system, comprising: a sensor network comprising a plurality of sensors for collecting data and respectively arranged in each to-be-estimated region and between the to-be-estimated regions; a model building module configured to build a horizontal human flow model and a vertical human flow model based on the plurality of sensors arranged in each to-be-estimated region and/or arranged between the to-be-estimated regions; and a human flow estimation module configured to estimate human flow data based on the horizontal human flow model and the vertical human flow model. The human flow estimation system proposed by the present invention is usually applied in a building, and therefore, the mentioned sensors in the to-be-estimated regions here are usually used for collecting human flow data within a single building floor, while the sensors between the to-be-estimated regions are usually used for collecting human flow data of a connected place of floors; these sensor data are used to respectively build a horizontal human flow model reflecting changes in the human flow data within each floor, and a vertical human flow model reflecting changes in the human flow data between floors; and human flow data everywhere is estimated on this basis, realizing the three-dimensional estimation of human flow data and having a relatively very high estimation accuracy.

Optionally, in order to further improve the estimation accuracy of the system, sensor data and other non-sensor data can also be combined and analyzed together to obtain a result.

As one embodiment, in order to realize the collection of non-sensor data, the human flow estimation system further comprises an auxiliary information collection module configured to respectively collect first auxiliary information in each to-be-estimated region and second auxiliary information between the to-be-estimated regions, wherein the first auxiliary information and the second auxiliary information are used for reflecting changes in the human flow data. These acquired auxiliary information can, on one hand, be directly used in an output result of human flow estimation, and on the other hand can also provide a possible interval of human flow data to help modifying monitored data of the sensors. Further explanation will be made below in conjunction with examples.

For example, the first auxiliary information can comprise the usage amount of water and/or electricity in each to-be-estimated region. More specifically, the usage amount of water and/or electricity is used for defining human flow data of a to-be-estimated region into a first data interval. At this point, the human flow estimation module can modify the estimated human flow data based on the first data interval. That is, according to the usage amount of water and/or electricity in the to-be-estimated region, it can be roughly determined that the human flow in the first data interval might exist in the to-be-estimated region by experience. At this point, if the data collected by a sensor falls into the first data interval, it indicates that the data collected by the sensor has a relatively high credibility; and if the data collected by a sensor deviates from this first data interval, it indicates that the data collected by the sensor has a relatively low credibility, and the data weight thereof should be lowered, or the data should be adjusted based on the first data interval, or the corresponding sensor should be overhauled.

For another example, the second auxiliary information comprises a load variation value of a passenger transportation device between the to-be-estimated regions. More specifically, the load variation value of the passenger transportation device is used for reflecting changed human flow data in the to-be-estimated regions where load variation takes place. At this point, the human flow estimation module is configured to modify the estimated human flow data based on the load variation value of the passenger transportation device. For example, a sensor (such as a video camera) can further be arranged in the passenger transportation device to directly detect human flow data. At this point, the human flow data of the passenger transportation device can be acquired through the load variation value of the passenger transportation device, the human flow data of the passenger transportation device can also be acquired through the sensor, and it is also possible to combine the both or to modify one of the both via the other one, so as to acquire more accurate human flow data of the passenger transportation device. That is, if the data variation value collected by the sensor is close to the human flow data variation value possibly corresponding to the load variation value of the passenger transportation device, it is indicated that the data collected by the sensor has a relatively high credibility; and if the data variation value collected by the sensor largely deviates from the human flow data variation value possibly corresponding to the load variation value of the passenger transportation device, it is indicated that the data collected by the sensor has a relatively low credibility, and the data weight thereof should be lowered, or the data should be adjusted based on the load variation value, or the corresponding sensor should be overhauled.

Similarly, in order to further improve the accuracy of data estimation, it is also possible to assist estimation by inputting data manually.

For example, the sensor network further comprises an auxiliary input end for a user to input human flow data of a specific to-be-estimated region; and the model building module is configured to build the horizontal human flow model and the vertical human flow model based on the plurality of sensors arranged in each to-be-estimated region and/or arranged between the to-be-estimated regions and the auxiliary input end. In application, the data from the auxiliary input end has a higher data weight than the data from the sensors. At this point, it can be believed that the human flow data in the specific to-be-estimated region that is inputted by the user through the auxiliary input end has a fairly high credibility, and no matter whether the data collected by the sensor there is comparable thereto, it can be ignored, and the human flow data inputted by the user should be directly applied to build models. Moreover, at this point, if the data collected by the sensor largely deviates from the human flow data inputted by the user, the corresponding sensor can be overhauled. It should be known that the user mentioned in the previously stated embodiment not only can be some specialized personnel but also can be a part-time worker such as a building inspection personnel or an elevator guidance personnel.

In addition, more exquisite improvements are also made here to other components in the human flow estimation system, which will be explained below one by one.

For example, the estimated human flow data can comprise data such as human flow volume and/or human flow density, etc., so as to provide a required output result in different application scenarios.

Optionally, the horizontal human flow model and the vertical human flow model respectively comprise a human flow state model and a sensor network model. The human flow state model is used to reflect the human flow density at the place where each sensor is arranged or the human flow entering and leaving the place where each sensor is arranged. The sensor network model is used to reflect the monitored data of each sensor in the sensor network. Further, the model building module comprises a dynamic sensor fusion submodule configured to build the sensor network model based on the data of the plurality of sensors.

Optionally, the model building module is configured to analyze the human flow state model and the sensor network model based on the Kalman filter algorithm, the Bayesian Networks algorithm or the Dempster Shafer (DS) evidence algorithm. Similarly, the human flow estimation module is also configured to estimate the human flow based on the Kalman filter algorithm, the Bayesian Networks algorithm or the DS evidence algorithm. The previously stated algorithms are relatively mature algorithms in the field of model building and analysis, and therefore will not be described herein any more.

Optionally, the sensor divides the to-be-estimated region into a plurality of to-be-estimated subregions; and the sensor is used for detecting human flow data in each to-be-estimated subregion and/or human flow data between adjacent to-be-estimated subregions. Specifically, for the same floor, there are also a plurality of rooms or corridors inside. Therefore, it is also necessary to divide these regions into several to-be-estimated subregions and respectively estimate the human flow data in each place and the changes in the human flow data therebetween.

Optionally, the sensor comprises a light beam sensor and/or a passive infrared (PIR) sensor and/or a video camera.

Optionally, human flow data change media between the to-be-estimated regions include passenger transportation devices and/or stairs. The passenger transportation device can include elevators, escalators, and various other means of transportation. The human flow between the to-be-estimated regions can be transferred through these human flow data change media.

Figure 2:
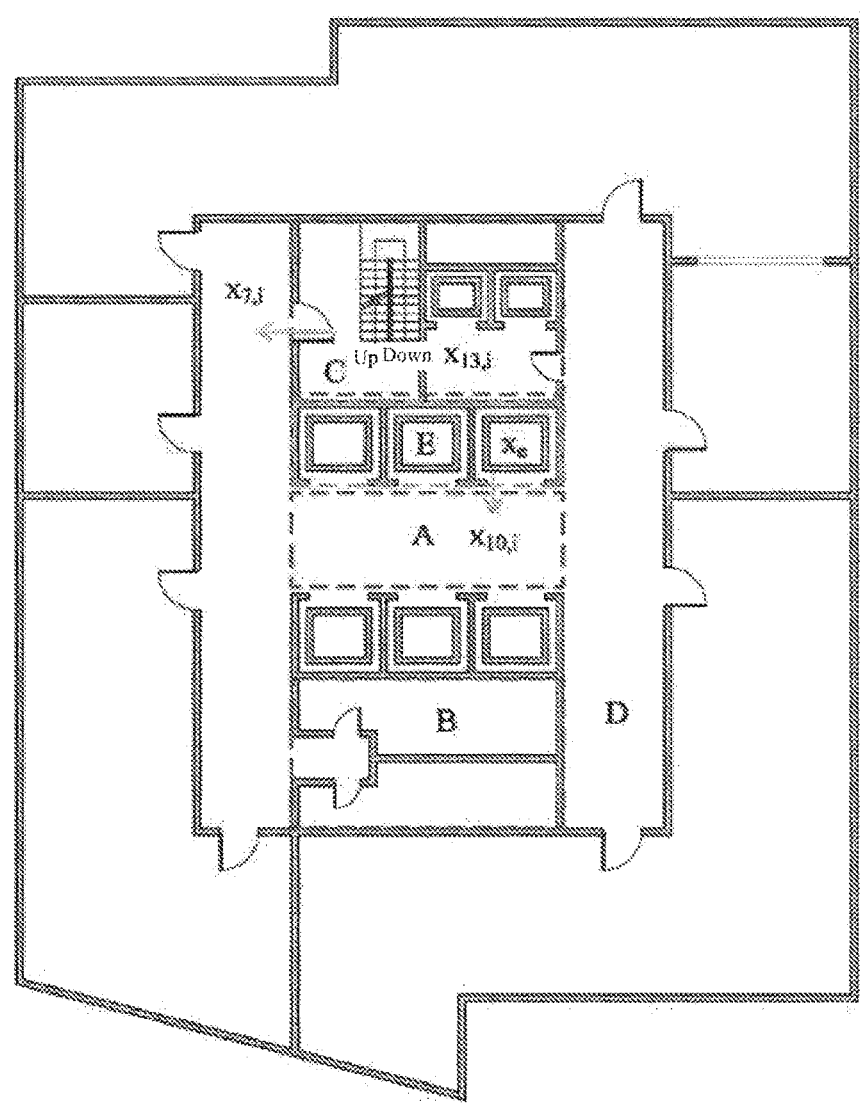
FIG. 2 is a schematic layout diagram of the human flow moving between floors in an embodiment where the human flow estimation system of the present invention is applied in a building with multiple floors.
Figure 3:
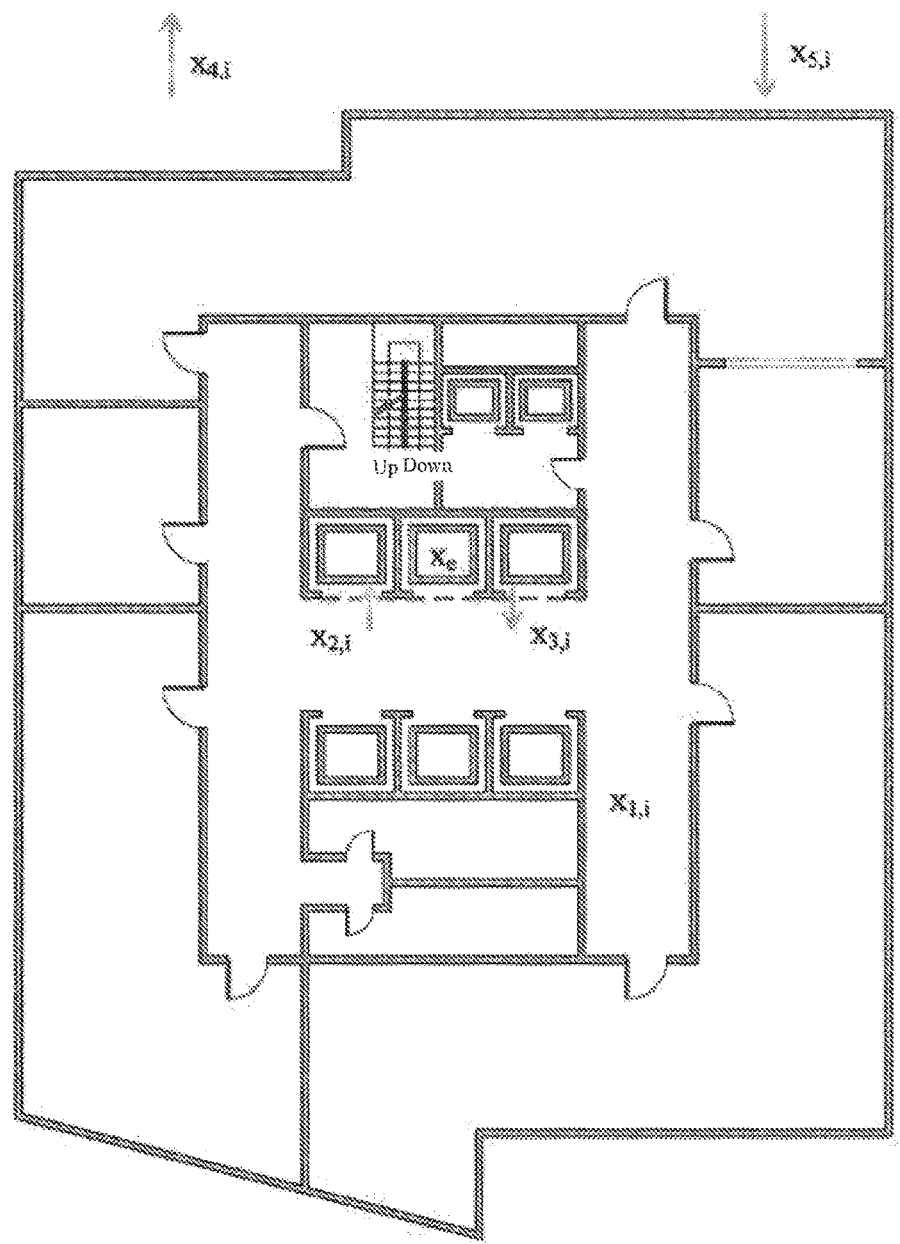
FIG. 3 is a schematic layout diagram of another embodiment where the human flow estimation system of the present invention is applied in a building with multiple floors.

In order to reflect the application effect of each of the previously stated solutions or optional solutions, an application embodiment of a human flow estimation system will be provided here in conjunction with the previously stated solutions and FIG. 1 to FIG. 3; and this example reflects a comprehensive estimation of the human flow estimation system applied in a multi-floor building. The system estimates the human flow in a to-be-estimated region in real time based on a dynamic human flow state model and through the Kalman filter algorithm. For the system, the human flow state model thereof can be expressed as:

$$x(t+1)=Ax(t)+w(t);$$

$$y(t)=Cx(t)+v(t);$$

referring to FIG. 1 again, in the example, pay close attention to 4 to-be-estimated subregions (i.e. regions A-D shown in the figure) of a specific floor (e.g. the first floor), where region A refers to the corridor region adjacent to the elevator in the middle floor of FIG. 1; region B refers to the lounge at the lower side of FIG. 1; region C refers to the staircase and the freight elevator at the upper side of FIG. 1; and region D refers to the entire peripheral region in the floor. These 4 regions are respectively divided by 1 PIR sensor and 5 video cameras. Moreover, 14 states in total are defined for the human flow and the number of people in these regions:

$x_1$: the number of people entering region A from the right side of region D;
$x_2$: the number of people entering the right side of region D from region A;
$x_3$: the number of people entering the left side of region D from region A;
$x_4$: the number of people entering region A from the left side of region D;
$x_5$: the number of people entering the left side of region D from region B;
$x_6$: the number of people entering region B from the left side of region D;
$x_7$: the number of people entering the left side of region D from region C;
$x_8$: the number of people entering region C from the left side of region D;
$x_9$: the number of people entering the elevator from region A;
$x_{10}$: the number of people entering region A from the elevator;
$x_{11}$: the number of people in region A;
$x_{12}$: the number of people in region B;
$x_{13}$: the number of people in region C;
$x_{14}$: the number of people in region D;
and the human flow state model for the example is:

$$x_1(t+1)=a_1x_{14}(t)+w_1(t);$$

$$x_2(t+1)=a_2x_{11}(t)+w_2(t);$$

$$x_3(t+1)=a_3x_{11}(t)+w_3(t);$$

$$x_4(t+1)=a_4x_{14}(t)+w_4(t);$$

$$x_5(t+1)=a_5x_{12}(t)+w_5(t);$$

$$x_6(t+1)=a_6x_{14}(t)+w_6(t);$$

$$x_7(t+1)=a_7x_{13}(t)+w_7(t);$$

$$x_8(t+1)=a_8x_{14}(t)+w_8(t);$$

$$x_9(t+1)=a_9x_{11}(t)+w_9(t);$$

$$x_{10}(t+1)=x_{10}(t)+w_{10}(t);$$

$$x_{11}(t+1)=x_{11}(t)+x_1(t)-x_2(t)-x_3(t)+x_4(t)-x_9(t)+x_{10}(t)+w_{11}(t);$$

$$x_{12}(t+1)=x_{12}(t)-x_5(t)+x_6(t)+w_{12}(t);$$

$$x_{13}(t+1)=x_{13}(t)-x_7(t)+x_8(t)+w_{13}(t); \text{ and}$$

$$x_{14}(t+1)=x_{14}(t)-x_1(t)+x_2(t)+x_3(t)-x_4(t)+x_5(t)-x_6(t)+x_7(t)-x_8(t)+w_{14}(t).$$

The above-mentioned human flow model is only built for specific floors, where $a_i$ respectively represents the proportion of the number of people entering another region from a corresponding region.

On this basis, to build a human flow model with a plurality of specific floors, several variable equations need to be further introduced. Referring to FIG. 2, as the human flow can enter other floors through elevator E or staircase C, etc., human flow data in different elevators and in the staircase also need to be estimated. It should be understood that the human flow can enter any floor via the elevators but can only enter an adjacent floor via the staircase. Therefore, supplementary model equations comprise:

suppose the number of people in the elevator is $x_e$, then:

$$x_{10,i}(t+1)=a_i x_e(t)+w_{10}(t);$$

wherein if the elevator stops at floor i, $0<a_i<1$; otherwise, $a_i=0$.

Suppose the number of people transferring to floor i+1 through the staircase is $x_{15,i}$; the number of people transferring to floor i−1 through the staircase is $x_{16,i}$; and the number of people leaving the staircase is $x_{7,i}$, then:

$$x_{7,i}(t+1)=a_{10}x_{13,i}(t)+w_7(t);$$

$$x_{15,i}(t+1)=a_{11}x_{13,i}(t)+w_{15}(t);$$

$$x_{16,i}(t+1)=a_{12}x_{13,i}(t)+w_{16}(t);$$

in summary, if the building has N floors, the number of states owned by the model is 16N+1. Based on this model, the human flow data of the 16N+1 states can be respectively estimated.

Referring to FIG. 3, as a simplification, to directly build models from the supervision level, it only needs to learn the following states: the total number of people on each floor $x_{1,i}$; the number of people in the elevator $x_{e,i}$; the number of people entering or leaving the elevator $x_{2,i}$, $x_{3,i}$; and the total number of people going upstairs or downstairs from the staircase $x_{4,i}$, $x_{5,i}$. At this point, based on the model, the estimation and management of human flow data in the building can be realized by only estimating the human flow data of the 5N+1 states. In practical application, this management is applicable to the aspects of elevator dispatching, air conditioner distribution, safety management, and the open of the entrance and the exit, etc.

Figure 4:
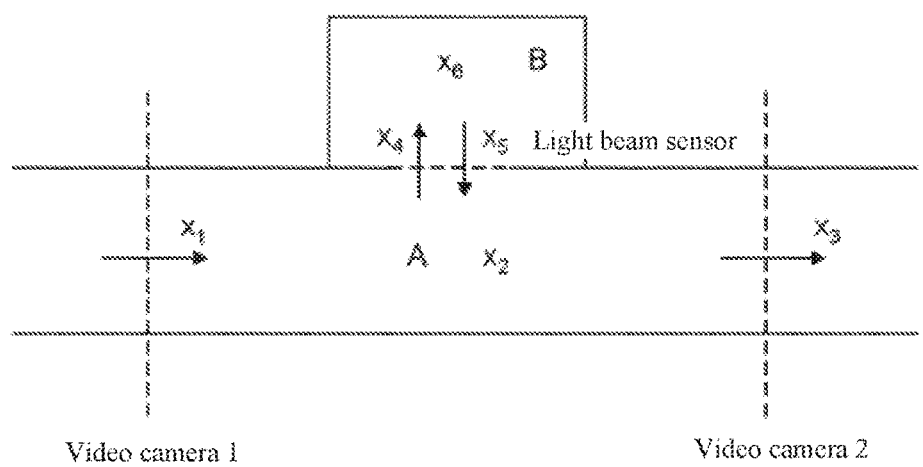
FIG. 4 is a schematic layout diagram of one embodiment where the human flow estimation system of the present invention is applied in a to-be-estimated region together with non-sensor auxiliary information.

In addition, another application embodiment of the human flow estimation system is provided in conjunction with the previously stated solutions and FIG. 4, which estimates the human flow in a to-be-estimated region in real time based on a dynamic human flow state model and through the Kalman filter algorithm. At the same time, the estimation accuracy of the system is also improved by way of adding an auxiliary input end and inputting data manually. For the system, the human flow state model thereof can be expressed as:

$$x(t+1)=Ax(t)+w(t+1);$$

$$y(t)=Cx(t)+v(t);$$

wherein x represents a state vector, and y represents a measured value vector; and w and v are vectors respectively representing the uncertainties of the human flow state model and the measured value model.

Referring to FIG. 4 again, an example of a simple to-be-estimated region where the human flow estimation system is applied is shown. The example reflects a first adjustment mode for the human flow state model and the sensor network model when anomalies occur in the sensors. In this example, there are 2 to-be-estimated subregions: one room and one corridor. In the to-be-estimated regions, 6 states are defined:

$x_1$: the number of people entering the corridor;
$x_2$: the number of people in the corridor;
$x_3$: the number of people leaving the corridor;
$x_4$: the number of people entering the room;
$x_5$: the number of people leaving the room; and
$x_6$: the number of people in the room.

The human flow state model for the example is:

$$x_1(t+1)=x_1(t)+w_1(t+1);$$

$$x_2(t+1)=x_2(t)+x_1(t)-x_3(t)-x_4(t)+x_5(t)+w_2(t+1);$$

$$x_3(t+1)=a_1 \times x_2(t)+w_3(t+1);$$

$$x_4(t+1)=a_2 \times x_2(t)+w_4(t+1);$$

$$x_5(t+1)=a_3 \times x_6(t)+w_5(t+1);$$

$$x_6(t+1)=x_6(t)+x_4(t)-x_5(t)+w_6(t+1);$$

where $a_i$ is an unknown parameter which can be taken as the ratio of people entering another region from a specific region within sample time. For example, $a_1$ is the ratio of people leaving the corridor within one period of sample time; $a_2$ is the ratio of people entering the room within one period of sample time; and $a_3$ is the ratio of people leaving the room within one period of sample time.

As above, 6 equations are built through the mutual relation between the number of people in each to-be-estimated subregion and the number of people entering and leaving the to-be-estimated subregion, and therefore, the number of people in each to-be-estimated subregion and the human flow entering and leaving same can be obtained, by way of analysis and processing, through a plurality of sensors that divide these two to-be-estimated subregions.

Specifically, in the example, four sensors including two light beam sensors and two video cameras 1 and 2 are used to acquire human flow data and human flow data. The sensor network model here is:

$$y_1(t)=x_1(t)+v_1(t);$$

$$y_2(t)=x_3(t)+v_2(t);$$

$$y_3(t)=x_4(t)+v_3(t);\text{ and}$$

$$y_4(t)=x_5(t)+v_4(t);$$

where $y_1$ and $y_2$ are measured values from the video cameras, while $y_3$ and $y_4$ are measured values from the light beam sensors. $v_i$ is the uncertainty of the measured values.

As above, 4 equations are built through the mutual relation between the detected data of each sensor and the human flow related to the detected data, and therefore partial human flow data related to these sensors can be directly obtained.

Continuing with the previously stated embodiment, if one personnel is inspecting to-be-estimated subregion A, he/she is able to provide, with extremely high precision, the exact number of people in to-be-estimated subregion A, and at this point an equation can be correspondingly added in the model:

$$y_5(t)=x_2(t)+v_5(t);$$

and since the input value of the personnel is of very high precision, a very small value can be assigned to the uncertainty $v_5(t)$. In the Kalman filter-based algorithm, a very small covariance value can be set in the human-based sensor model and the subsequent Kalman filter calculation thereof, and therefore, the data weight or contribution degree of the human input value will automatically increase. Such setting can bring more accurately estimated human flow data after the value inputted by the personnel is applied.

According to another aspect of the present invention, also provided is a human flow estimation method applied in the human flow estimation system in the previously stated embodiments. The human flow estimation method at least comprises: a data collection step S100 for collecting data in each to-be-estimated region and between the to-be-estimated regions through a sensor network; a model building step S200 for building a horizontal human flow model and a vertical human flow model based on the data in each to-be-estimated region and/or arranged between the to-be-estimated regions; and a human flow estimation step S300 for estimating human flow data based on the horizontal human flow model and the vertical human flow model. Through the above steps, the human flow estimation system can effectively use the sensor data to build a horizontal human flow model and a vertical human flow model that can respectively reflect the changes in the human flow data in the floors and between the floors, and estimate each piece of human flow data on this basis, thereby realizing three-dimensional estimation of the human flow data and having a relatively very high estimation accuracy.

In addition, to further improve the accuracy of data estimation, optional changes can be made to the previously stated method.

For example, the data collection step S100 further comprises: collecting first auxiliary information in each to-be-estimated region and second auxiliary information between the to-be-estimated regions, wherein the first auxiliary information and the second auxiliary information are used for reflecting changes in the human flow data; and the human flow estimation step S300 further comprises: modifying the estimated human flow data based on the first auxiliary information and/or the second auxiliary information. Therefore, changes in the human flow data can be monitored by other auxiliary information outside the sensors, thereby improving the accuracy of judgment and estimation of the system.

Two examples for improving estimation accuracy through auxiliary information will be provided below.

For example, in the data collection step S100, the first auxiliary information comprises the usage amount of water and/or electricity in each to-be-estimated region, for defining the human flow data of the to-be-estimated region into a first data interval; and in the human flow estimation step S300, the estimated human flow data is modified based on the first data interval. Therefore, according to the usage amount of water and/or electricity in the to-be-estimated regions, it can be roughly determined that human flow in the first data interval might exist in the to-be-estimated regions by experience. At this point, if the data collected by a sensor falls into the first data interval, it indicates that the data collected by the sensor has a relatively high credibility; and if the data collected by a sensor deviates from this first data interval, it indicates that the data collected by the sensor has a relatively low credibility, and the data weight thereof should be lowered, or the data should be adjusted based on the first data interval, or the corresponding sensor should be overhauled.

For another example, in the data collection step S100, the second auxiliary information comprises a load variation value of a passenger transportation device between the to-be-estimated regions, for reflecting changed human flow data in the to-be-estimated regions where load variation takes place; and in the human flow estimation step S300, the estimated human flow data is modified based on the load variation value of the changed human flow data of the passenger transportation device. At this point, if the data variation value collected by a sensor is close to the human flow data variation value possibly corresponding to the load variation value of the passenger transportation device, it indicates that the data collected by the sensor has a relatively high credibility; and if the data variation value collected by a sensor largely deviates from the human flow data variation value possibly corresponding to the load variation value of the passenger transportation device, it indicates that the data collected by the sensor has a relatively low credibility, and the data weight thereof should be lowered, or the data should be adjusted based on the load variation value, or the corresponding sensor should be overhauled.

Similarly, in order to further improve the accuracy of data estimation, it is also possible to assist estimation by inputting data manually.

For example, the data collection step S100 further comprises: collecting human flow data of a specific to-be-estimated region that is inputted by a user through an auxiliary input end; and in the human flow estimation step S300, the data from the auxiliary input end has a higher data weight than the data from the sensors. At this point, it can be believed that the human flow data in the specific to-be-estimated region that is inputted by the user through the auxiliary input end has a fairly high credibility, and no matter whether the data collected by the sensor there is comparable thereto, the data can be ignored and should be directly replaced by the human flow data inputted by the user to build models. Moreover, at this point, if the data collected by the sensor largely deviates from the human flow data inputted by the user, the corresponding sensor can be overhauled.

The above examples mainly describe the human flow estimation system and the human flow estimation method of the present invention. Although only some embodiments of the present invention are described, a person of ordinary skill in the art should understand that the present invention can be implemented in many other forms without deviating from the concept and scope thereof. Therefore, the illustrated examples and implementations are considered illustrative but not restrictive, and the prevent invention can cover various modifications and replacements without departing from the spirit and scope of invention defined by the appended claims.

The invention claimed is:

1. A human flow estimation system comprising:
a sensor network comprising a plurality of sensors for collecting data and respectively arranged in each to-be-estimated region and between the to-be-estimated regions;
a model building module configured to build a horizontal human flow model and a vertical human flow model based on the plurality of sensors arranged in each to-be-estimated region and/or arranged between the to-be-estimated regions;
a human flow estimation module configured to estimate human flow data based on the horizontal human flow model and the vertical human flow model; and
an auxiliary information collection module configured to respectively collect first auxiliary information in each to-be-estimated region acquired by a non-sensor and second auxiliary information between the to-be-estimated regions acquired by a non-sensor, wherein the first auxiliary information and the second auxiliary information are used for reflecting changes in the human flow data.

2. The human flow estimation system according to claim 1, wherein the first auxiliary information comprises the usage amount of water and/or electricity in each to-be-estimated region.

3. The human flow estimation system according to claim 2, wherein the usage amount of water and/or electricity is used for defining the human flow data of the to-be-estimated region into a first data interval.

4. The human flow estimation system according to claim 3, wherein the human flow estimation module is configured to modify the estimated human flow data based on the first data interval.

5. The human flow estimation system according to claim 1, wherein the second auxiliary information comprises a load variation value of a passenger transportation device between the to-be-estimated regions.

6. The human flow estimation system according to claim 5, wherein the load variation value of the passenger transportation device is used for reflecting changed human flow data in the to-be-estimated regions when load variation takes place.

7. The human flow estimation system according to claim 6, wherein the human flow estimation module is configured to modify the estimated human flow data based on the load variation value of the passenger transportation device.

8. The human flow estimation system according to claim 1, wherein the sensor network further comprises an auxiliary input end for a user to input human flow data of a specific to-be-estimated region; and the model building module is configured to build the horizontal human flow model and the vertical human flow model based on the plurality of sensors arranged in each to-be-estimated region and/or arranged between the to-be-estimated regions and the auxiliary input end.

9. The human flow estimation system according to claim 8, wherein data from the auxiliary input end has a higher data weight than data from the sensors.

10. The human flow estimation system according to claim 1, wherein the human flow data comprises human flow volume and/or human flow density.

11. The human flow estimation system according to claim 1, wherein the horizontal human flow model and the vertical human flow model respectively comprise a human flow state model and a sensor network model.

12. The human flow estimation system according to claim 11, wherein the model building module is configured to analyze the human flow state model and the sensor network model based on a Kalman filter algorithm, a Bayesian Networks algorithm or a DS evidence algorithm.

13. The human flow estimation system according to claim 11, wherein the model building module comprises a dynamic sensor fusion submodule configured to build the sensor network model based on the data of the plurality of sensors.

14. The human flow estimation system according to claim 1, wherein the sensor divides the to-be-estimated region into a plurality of to-be-estimated subregions; and the sensor is used for detecting human flow data in each to-be-estimated subregion and/or human flow data between adjacent to-be-estimated subregions.

15. The human flow estimation system according to claim 1, wherein the sensor comprises a light beam sensor and/or a PIR sensor and/or a video camera.

16. The human flow estimation system according to claim 1, wherein human flow data change media between the to-be-estimated regions comprise passenger transportation devices and/or stairs.

17. The human flow estimation system according to claim 1, wherein the human flow estimation module is configured to estimate the human flow based on the Kalman filter algorithm, the Bayesian Networks algorithm or the DS evidence algorithm.

18. A human flow estimation method, comprising:
   a data collection step S100, for collecting data in each to-be-estimated region and between the to-be-estimated regions through a sensor network;
   a model building step S200, for building a horizontal human flow model and a vertical human flow model based on the data in each to-be-estimated region and/or between the to-be-estimated regions; and
   a human flow estimation step S300, for estimating human flow data based on the horizontal human flow model and the vertical human flow model;
   wherein the data collection step S100 further comprises collecting first auxiliary information in each to-be-estimated region acquired by a non-sensor and second auxiliary information between the to-be-estimated regions acquired by a non-sensor, wherein the first auxiliary information and the second auxiliary information are used for reflecting changes in the human flow data; and
   the human flow estimation step S300 further comprises modifying the estimated human flow data based on the first auxiliary information and/or the second auxiliary information.

19. The human flow estimation method according to claim 18, wherein:
   in the data collection step S100, the first auxiliary information comprises the usage amount of water and/or electricity in each to-be-estimated region, for defining the human flow data of the to-be-estimated region into a first data interval; and
   in the human flow estimation step S300, the estimated human flow data is modified based on the first data interval.

20. The human flow estimation method according to claim 18, wherein:
   in the data collection step S100, the second auxiliary information comprises a load variation value of a passenger transportation device between the to-be-estimated regions, for reflecting changed human flow data in the to-be-estimated regions when load variation takes place; and
   in the human flow estimation step S300, the estimated human flow data is modified based on the load variation value of the passenger transportation device.

21. The human flow estimation method according to claim 18, wherein:
   the data collection step S100 further comprises: collecting human flow data of a specific to-be-estimated region that is inputted by a user through an auxiliary input end; and
   in the human flow estimation step S300, the data from the auxiliary input end has a higher data weight than the data from the sensors.

* * * * *